United States Patent
Kubo et al.

(10) Patent No.: US 6,807,275 B1
(45) Date of Patent: Oct. 19, 2004

(54) FOLDING PORTABLE TELEPHONE APPARATUS

(75) Inventors: Tetsuya Kubo, Kanagawa (JP);
Ryouichi Kaiwa, Kanagawa (JP);
Teruo Nanmoku, Kanagawa (JP);
Mamoru Yoshida, Kanagawa (JP);
Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 362 days.

(21) Appl. No.: 09/703,778

(22) Filed: Nov. 1, 2000

(30) Foreign Application Priority Data

Nov. 5, 1999 (JP) ........................................ P. 11-316118

(51) Int. Cl.⁷ ................................................ H04M 1/00
(52) U.S. Cl. .............................. 379/433.04; 379/433.13
(58) Field of Search ........................ 379/433.01, 433.04, 379/433.13; 455/90.3, 575.7, 566

(56) References Cited

U.S. PATENT DOCUMENTS

| | | | | |
|---|---|---|---|---|
| 5,896,575 A | * | 4/1999 | Higginbotham et al. | .... 455/566 |
| 5,926,748 A | * | 7/1999 | Yoshihara et al. | ....... 455/575.7 |
| 6,208,874 B1 | * | 3/2001 | Rudisill et al. | ............... 455/90 |
| 6,510,325 B1 | * | 1/2003 | Mack, II et al. | .............. 455/90 |

FOREIGN PATENT DOCUMENTS

| | | |
|---|---|---|
| CN | 1253461 A | 5/2000 |
| GB | 2 326 051 | 12/1998 |
| GB | 2 343 324 A | 5/2000 |
| JP | 6037697 | 2/1994 |
| JP | 11074953 | 3/1999 |

\* cited by examiner

*Primary Examiner*—Jack Chiang
(74) *Attorney, Agent, or Firm*—Pearne & Gordon LLP (57) ABSTRACT

First display (4) comprising a liquid crystal display is provided on the external surface of the first case body (1). In the near proximity of the first display (4), a non-voice radio communications service start button (5), scroll buttons (6*a*), (6*b*), and a selection/decision button (7) are provided. On the internal surface of the first case body (1), the second display 8, on the side of which is provided an antenna 9 retractable slantwise, is provided. In the first case body (1) is embedded a magnet (18) and in the second case body (2) is embedded a lead switch (19). When the main unit is folded to bring the magnet (18) in close proximity to the lead switch (19), the lead switch is turned ON. When the main unit is unfolded to place the magnet (18) apart from the lead switch (19), the lead switch is turned OFF. This allows detection of folding/unfolding of the case body.

5 Claims, 10 Drawing Sheets

FOLDING PORTABLE TELEPHONE APPARATUS

BACKGROUND OF THE INVENTION

The present invention relates to a folding portable telephone apparatus having a feature to display non-voice information such as text and graphics.

Recently, portable telephone apparatus has supported a non-voice radio communications service (hereinafter referred to as the service) on text information and graphics information such as the i mode service. Portable telephone apparatus receiving such a service allows the user to scroll through and read text information retrieved in a hierarchical fashion via service receiving operation, menu selecting operation, and scroll operation. In order to utilize the service, the portable telephone apparatus has only to comprise radio communications means, operation means for instructing start of the service, storage means for storing received information, display for displaying stored information, menu selection/decision means, scroll means, and control means for controlling the entire operation of the apparatus.

In conventional portable telephone apparatus having an input operation area for sending electronic mails and entering telephone numbers, a number of buttons are densely arranged on the operation panel of the operation area, and a large-sized liquid crystal display is used to display a number of characters. This inevitably upsizes the main body of the portable telephone apparatus.

Figure 10A:
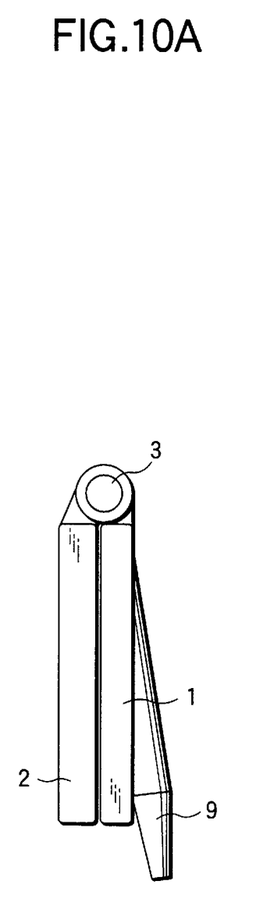
FIG. 10A is a side view of conventional folding portable telephone apparatus with the main body folded.
Figure 10B:
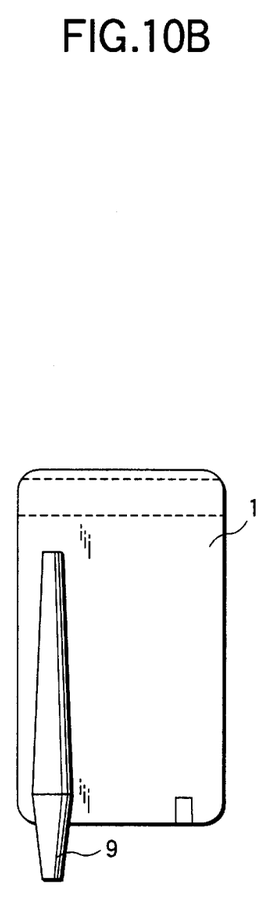
FIG. 10B is a front view of conventional folding portable telephone apparatus with the main body folded.
Figure 10C:
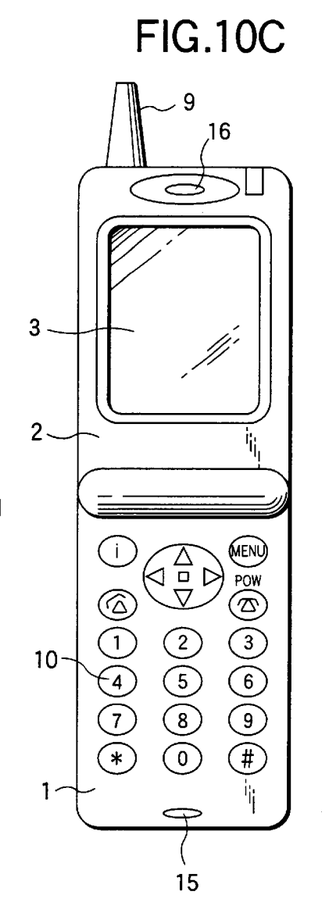
FIG. 10C is a front view of conventional folding portable telephone apparatus with the main body unfolded.

Thus, there emerged folding portable telephone apparatus for example as shown in FIGS. 10A–C which are unfolded when used and folded in two and carried along in compact size when not used. Such apparatus is always unfolded in larger size when used, and the apparatus is folded with the display panel and the operation panel facing each other. Thus it is impossible to see or touch the display panel and the operation panel with the apparatus folded. As a result, it is impossible to know the contents of received non-voice information such as text information or perform hierarchical retrieve operation wile the apparatus is folded in two in compact size.

SUMMARY OF THE INVENTION

The present invention aims at providing folding portable telephone apparatus whereby the user can display and scroll through non-voice information such as text and graphics, and retrieve such non-voice information in a hierarchical fashion and display the retrieved information with the apparatus folded in compact size, by providing display and operation means necessary for using non-voice radio communications service on the external surface of the main body of folding portable telephone apparatus.

The first aspect of the invention is a folding portable telephone apparatus having a folding main body, wherein the apparatus is equipped with first display for displaying received non-voice information on the external surface of the main body and second display on the internal surface of the main body. Via this configuration, it is possible to automatically display information of the non-voice radio communications service such as "seven o'clock news" and "twelve o'clock news" on the first display on the external surface of the main body without specific operation, when the folding portable telephone apparatus has received text information such as news information automatically distributed at predetermined times.

The second aspect of the invention is a folding portable telephone apparatus having a folding main body, wherein the apparatus is equipped with at least operation means for starting or terminating non-voice radio communications and first display for displaying received non-voice information on the external surface of the main body and second display on the internal surface of the main body. Via this configuration, the user can operate the operation means for starting non-voice radio communications with the folding portable telephone apparatus folded to request start of non-voice radio communications service and see the received non-voice information on the first display on the external surface of the main body.

The third aspect of the invention is a folding portable telephone apparatus according to the first or second aspect of the invention having at least a folding main body, first display for displaying received non-voice information on the external surface of the main body and second display on the internal surface of the main body, wherein the apparatus is adapted to display received non-voice information on the first display on the external surface of the main body while the main body is folded and to display received non-voice information on the second display on the internal surface of the main body while the main body is unfolded. Via this configuration, the information can be displayed on the display corresponding to the folding/unfolding state of the main body.

The fourth aspect of the invention is a folding portable telephone apparatus according to the first or second aspect of the invention having at least a folding main body, first display for displaying received non-voice information on the external surface of the main body and second display on the internal surface of the main body, wherein the apparatus is adapted to display received non-voice information on the first display on the external surface of the main body while the main body is folded and to display received non-voice information on the second display on the internal surface of the main body while the main body is unfolded, in order to switch to the display corresponding to a new folding/unfolding state when the folding/unfolding state of the main body has changed with the information displayed on the proper display. Via this configuration, the information can be displayed on the display corresponding to a new folding/unfolding state of the main body even when the folding/unfolding state has changed.

The fifth aspect of the invention is a folding portable telephone apparatus according to the fourth aspect of the invention having at least a folding main body, first display for displaying received non-voice information on the external surface of the main body and second display on the internal surface of the main body, wherein the apparatus is adapted to switch from the first display to the second display on the internal surface of the main body when the main body has been unfolded while received information is displayed on the second display on the internal surface of the main body as well as to delete the information on the first display and to display predetermined information. Via this configuration, it is possible to display predetermined information on the first display exposed when the main body has been unfolded.

The sixth aspect of the invention is a folding portable telephone apparatus according to the first or second aspect of the invention, wherein the apparatus is equipped with an antenna retractable slantwise on the side of the main body. Via this configuration, it is possible to keep the main body low-profile without the antenna protruding in the direction of thickness of the main body and reducing the protrusion of an antenna receiver at the foot of the antenna to downsize the main body in the direction of width, thereby making the main body easier to grasp. Further, the antenna receiver has been expelled from the external surface of the main body so that large-sized display can be provided on the external surface of the main body.

The seventh aspect of the invention is a folding portable telephone apparatus according to the sixth aspect of the invention, wherein the apparatus is equipped with an antenna retractable slantwise on the side of the main body not provided with display. Via this configuration, it is possible to fold/unfold the main body provided with display, irrespective of the direction of the antenna provided on the second main body not provided with display and whether the antenna is stretched or housed.

DETAILED DESCRIPTION OF THE PREFERRED EMBODIMENTS

Embodiments of the invention will be explained with reference to FIGS. 1 through 9.

Figures 1A, 1B:
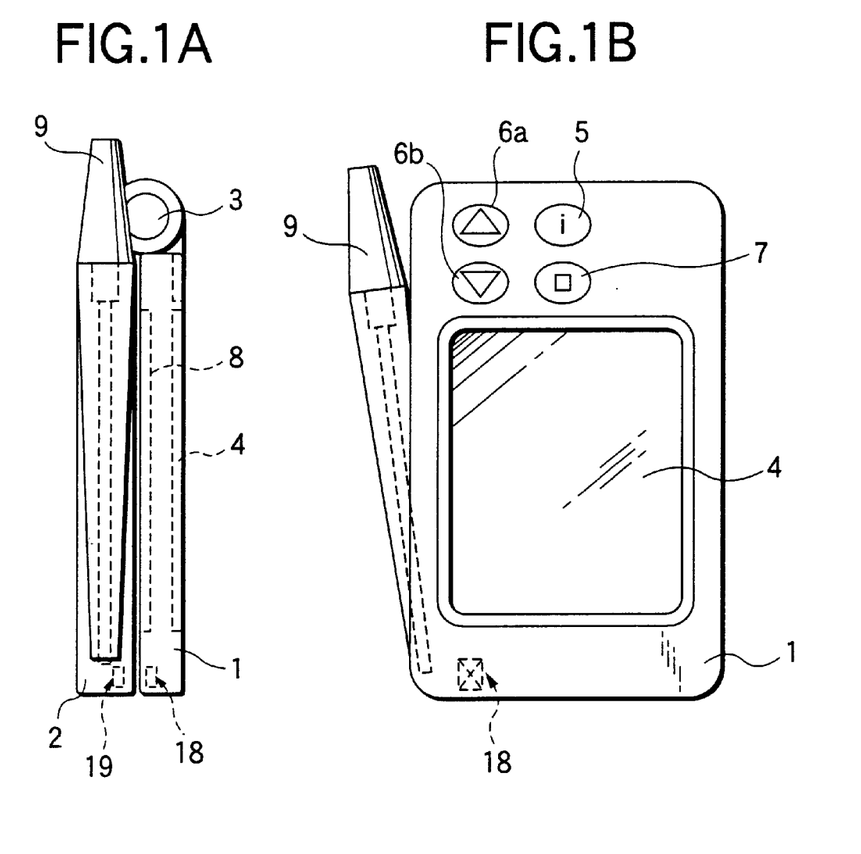
FIG. 1A is a side view of a folding portable telephone apparatus according to the first embodiment of the invention with the main body folded.
FIG. 1B is a front view of the folding portable telephone apparatus according to the first embodiment of the invention with the main body folded.
Figure 2A:
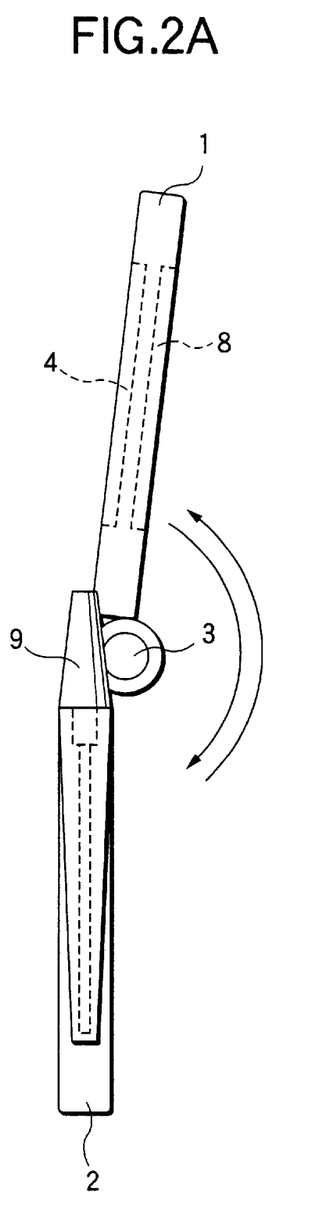
FIG. 2A is a side view of the folding portable telephone apparatus according to the first embodiment of the invention with the main body unfolded.
Figure 2B:
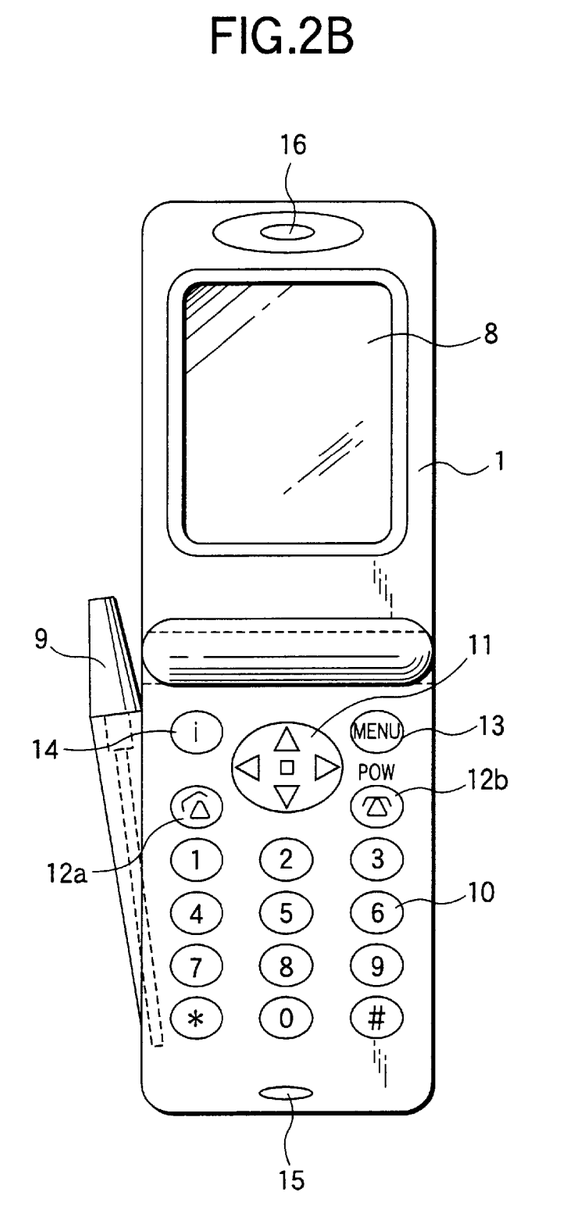
FIG. 2B is a front view of the folding portable telephone apparatus according to the first embodiment of the invention with the main body unfolded.

FIG. 1A is a side view of folding portable telephone apparatus according to the first embodiment of the invention with the main body folded. FIG. 1B is a front view of the folding portable telephone apparatus according to the first embodiment of the invention with the main body folded. FIG. 2A is a side view of the folding portable telephone apparatus according to the first embodiment of the invention with the main body unfolded. FIG. 2B is a front view of the folding portable telephone apparatus according to the first embodiment of the invention with the main body unfolded.

Configuration of the folding portable telephone apparatus will be briefly explained with reference to FIG. 1 and FIG. 2. A main body of the folding portable telephone apparatus having a first case body 1 and a second case body 2 coupled via a hinge 3 so that the first case body 1 and the second case body 2 can be folded or unfolded via the hinge 3. As shown in FIG. 1B, first display 4 comprising a liquid crystal display is provided on the external surface of the first case body 1. In the near proximity of the first display 4 are provided a non-voice radio communications service start button 5, scroll buttons 6a, 6b, and a selection/decision button 7.

On the internal surface of the first case body 1 is provided the second display 8, on the side of which is provided an antenna 9 retractable slantwise. In the first case body 1 is embedded a magnet 18 and in the second case body 2 is embedded a lead switch 19. When the main body is folded to bring the magnet 18 in close proximity to the lead switch 19, the lead switch is turned ON. When the main body is unfolded to place the magnet 18 apart from the lead switch 19, the lead switch is turned OFF. This allows detection of folding/unfolding of the main body.

FIG. 2A shows folding portable telephone apparatus with the first case body 1 unfolded upward. Unfolding the first case body 1 causes control means mentioned later to display text and graphics information on the second display 8 on the internal surface of the first case body 1. In the meantime, information displayed on the first display 4 when the main body is folded is deleted. Instead, a liquid crystal backlight blinks slowly.

On the internal surface of the second case body 2 shown in FIG. 2B are provided a key operation area composed of a ten-digit keypad 10, a so-called navigation key 11 comprising arrow keys for scrolling in four directions and a center key for determining target information, a call start key 12a, a call release key 12b, a menu key 13, a non-voice radio communications service start key 14 for receiving the non-voice radio communications service such as the i mode.

Below the second case body 2 is provided a transmitter (microphone) 15 and below the first case body 1 a receiver (speaker) 16. Voice communications use the ten-digit keypad 10, the navigation key 11, the call start key 12a, the call release key 12b, the menu key 13, the transmitter (microphone) 15, and the receiver (speaker) 16. Non-voice communications use the non-voice radio communications service start key 14 and the navigation key 11.

Figure 3A:
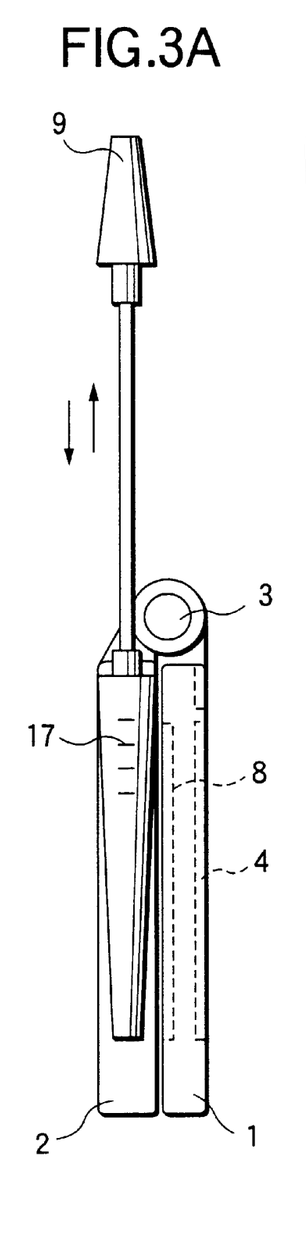
FIG. 3A is a side view of folding portable telephone apparatus according to the first embodiment of the invention with the main body folded.
Figure 3B:
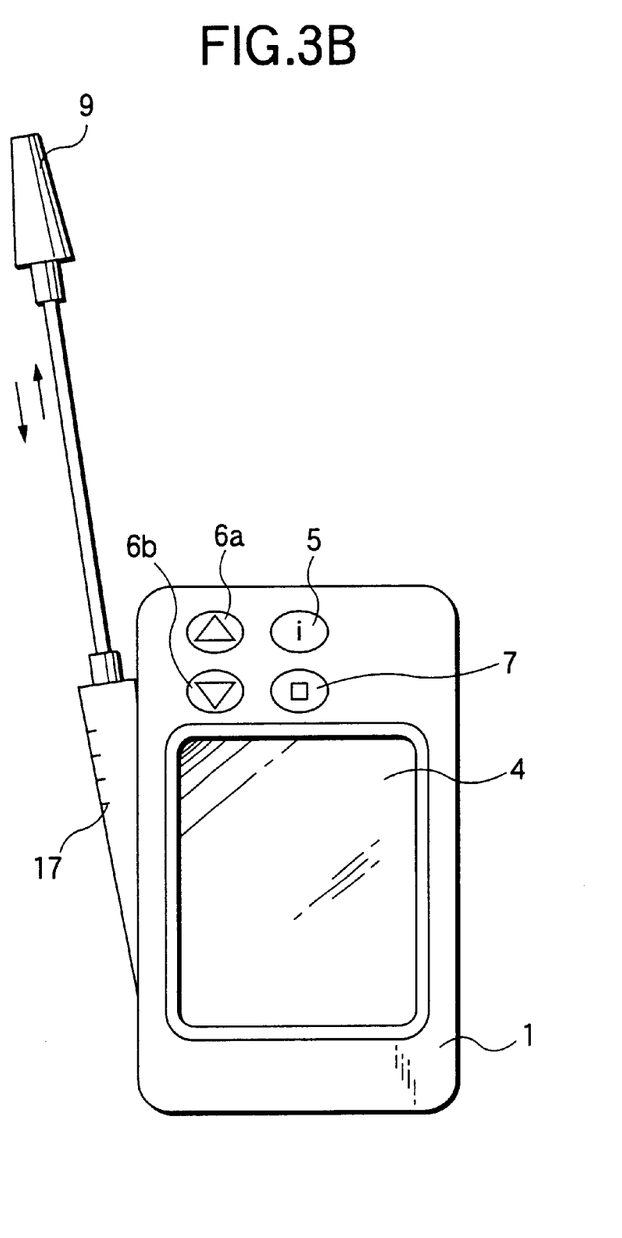
FIG. 3B is a front view of folding portable telephone apparatus according to the first embodiment of the invention with the main body folded.
Figure 4A:
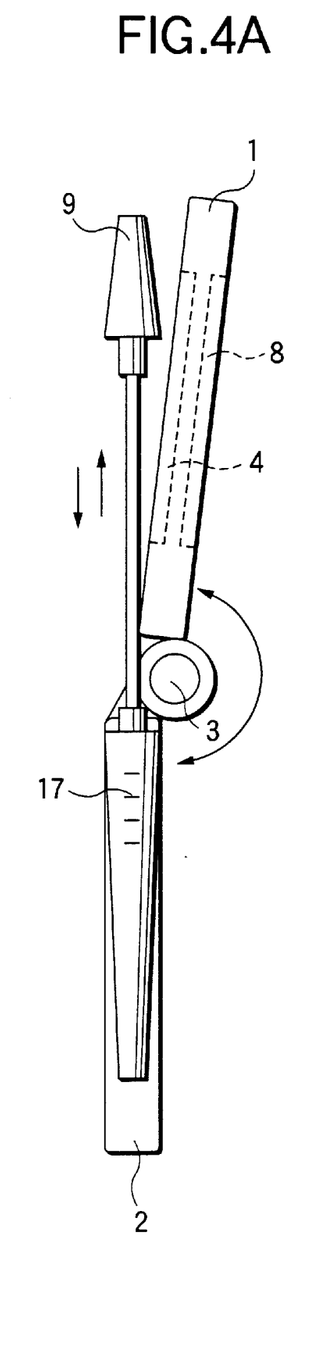
FIG. 4A is a side view of folding portable telephone apparatus according to the first embodiment of the invention with the main body unfolded.
Figure 4B:
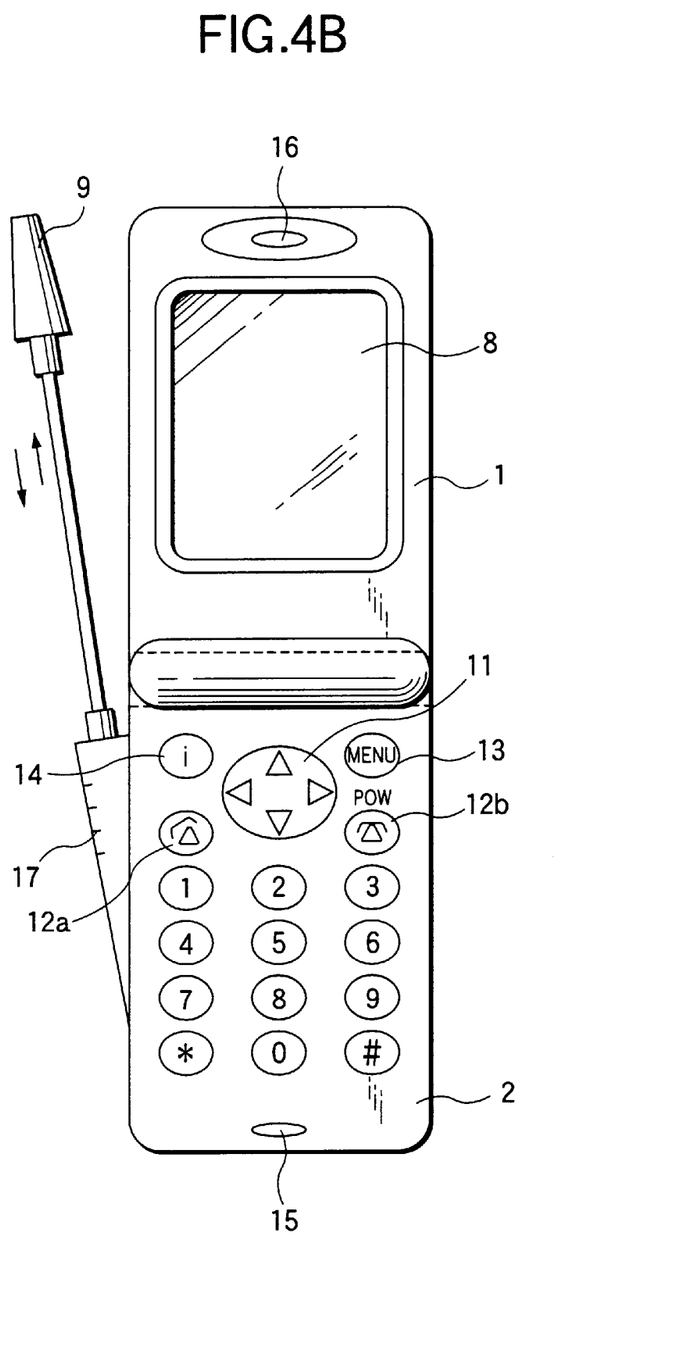
FIG. 4B is a front view of folding portable telephone apparatus according to the first embodiment of the invention with the main body unfolded.

FIG. 3A and FIG. 4A are side views of folding portable telephone apparatus according to the first embodiment of the invention with the antenna stretched. FIG. 3B and FIG. 4B are front views of the folding portable telephone apparatus with the antenna stretched. The invention supports an antenna 9 retractably from bottom to top on the side of the second case body 2 so that it is possible to fold/unfold the first case body 1 irrespective of the direction of the antenna 9 and whether the antenna 9 is stretched or housed. A side groove 17 works as a non-slip when the main body is grasped.

Figure 5A:
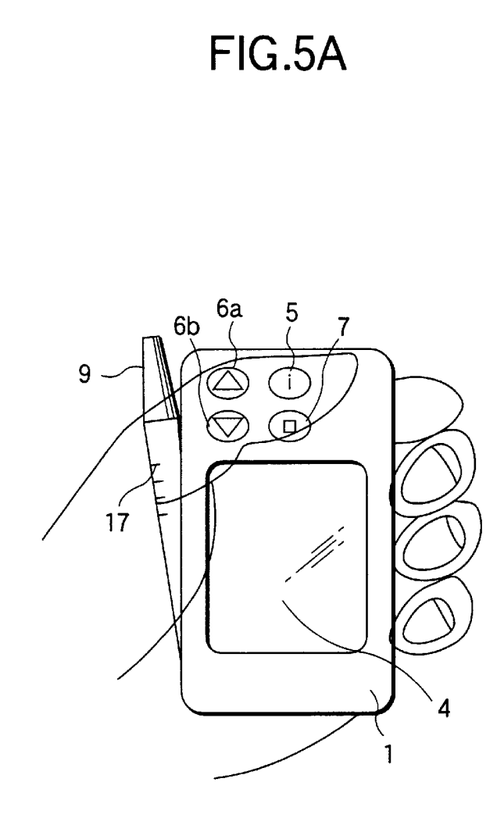
FIGS. 5A and 5B are external views of folding portable telephone apparatus according to the first embodiment of the invention while it is grasped.
Figure 5B:
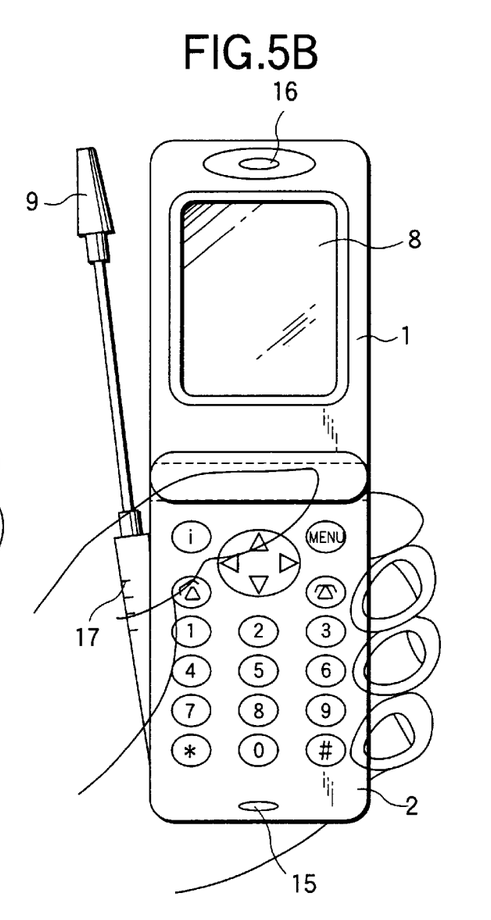
Figure 6:
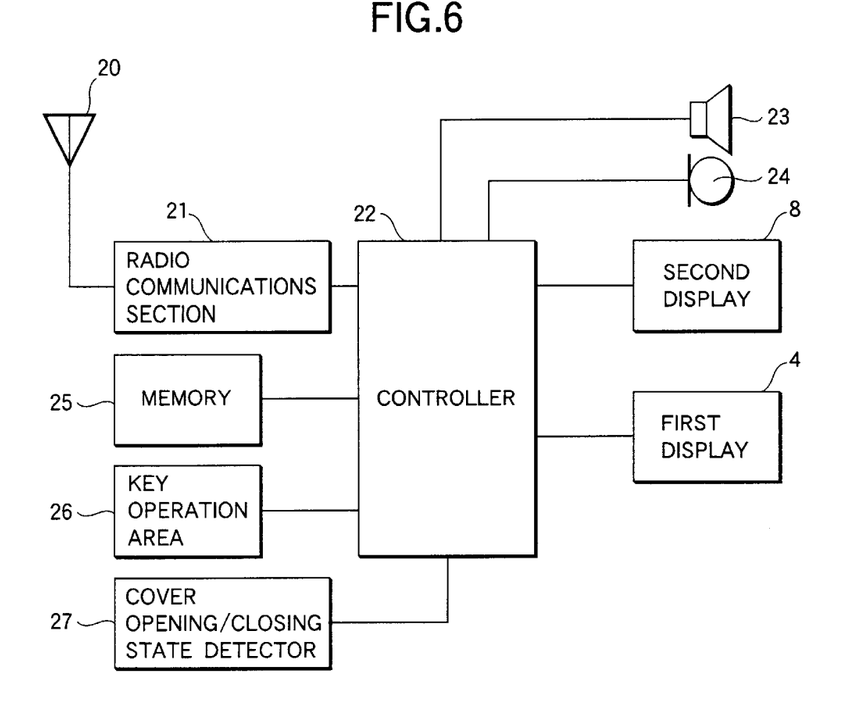
FIG. 6 is a block diagram of folding portable telephone apparatus according to the first embodiment of the invention.

FIG. 5A and FIG. 5B are external views of folding portable telephone apparatus according to the first embodiment of the invention while it is grasped. In the first embodiment of the invention, the user can hold the second case body 2 in his/her palm as shown in FIG. 5A and stretch the antenna as shown in FIG. 3. The user can also hold the second case body 2 in his/her palm as shown in FIG. 5B and stretch the antenna with the first case body 1 unfolded upward as shown in FIG. 4. In either case, the user can hold the second case body 2 in his/her palm as shown in FIG. 5A and FIG. 5B with the antenna 9 retractable from bottom to top on the side of the second case body 2, irrespective of whether the main body is folded or unfolded. FIG. 6 is a block diagram of a simple configuration of folding portable telephone apparatus according to an embodiment of the invention. In FIG. 6, radio waves coming from an antenna 20 are received by the receiver (not shown) of a radio communications section 21 and received information is transferred to a controller 22. The controller 22 displays the received information such as telephone numbers on the first display 4 or on the second display 8. Received information other than telephone numbers includes for example text information of non-voice radio communications service such as news information automatically distributed at predetermined times. It is possible to automatically display information of the non-voice radio communications service such as "seven o'clock news" and "twelve o'clock news" on the first display on the external surface of the first case body 1 without specific operation, or display the same information on the second display 8 on the internal surface of the first case body 1 while the main body in unfolded, when automatically distributed news information, etc. is received.

The controller 22 illuminates the display 4, 8 using a backlight via setting. The controller 22 also converts received information to voice information and outputs the voice information from a receiver (speaker) 23. The transmitter (microphone) 24 transfers the user's voice to the controller 22 and transmits the information to the distant party via a transmitter (not shown) of the radio communications section 21 and the antenna 20. A key operation area 26 composed of a ten-digit keypad and a scroll key is adapted to input signals to the controller 22 via key operation and to store telephone number information, etc. in the memory 25 via the controller 22.

When the non-voice radio communications service start button 5 (FIG. 1B) or 14 (FIG. 2B is pressed, the controller 22 uses the transmitter (not shown) of the radio communications section 21 and the antenna 20 to transmit signals requesting the non-voice radio communications service to a base station. Non-voice radio communications service information transmitted from the base station is received via the antenna 20 and the receiver (not shown) of the radio communications section 21 and the controller stores the received information in the memory 25. The cover opening/closing state detector 27, on detecting the cover opening/closing state, transfers the detected information to the controller 22. The controller 22, based on the above detected results, displays the nonvoice information stored in the memory 25 on the first display 4 or second display 8 corresponding to the opening/closing state of the main body.

Figure 7:
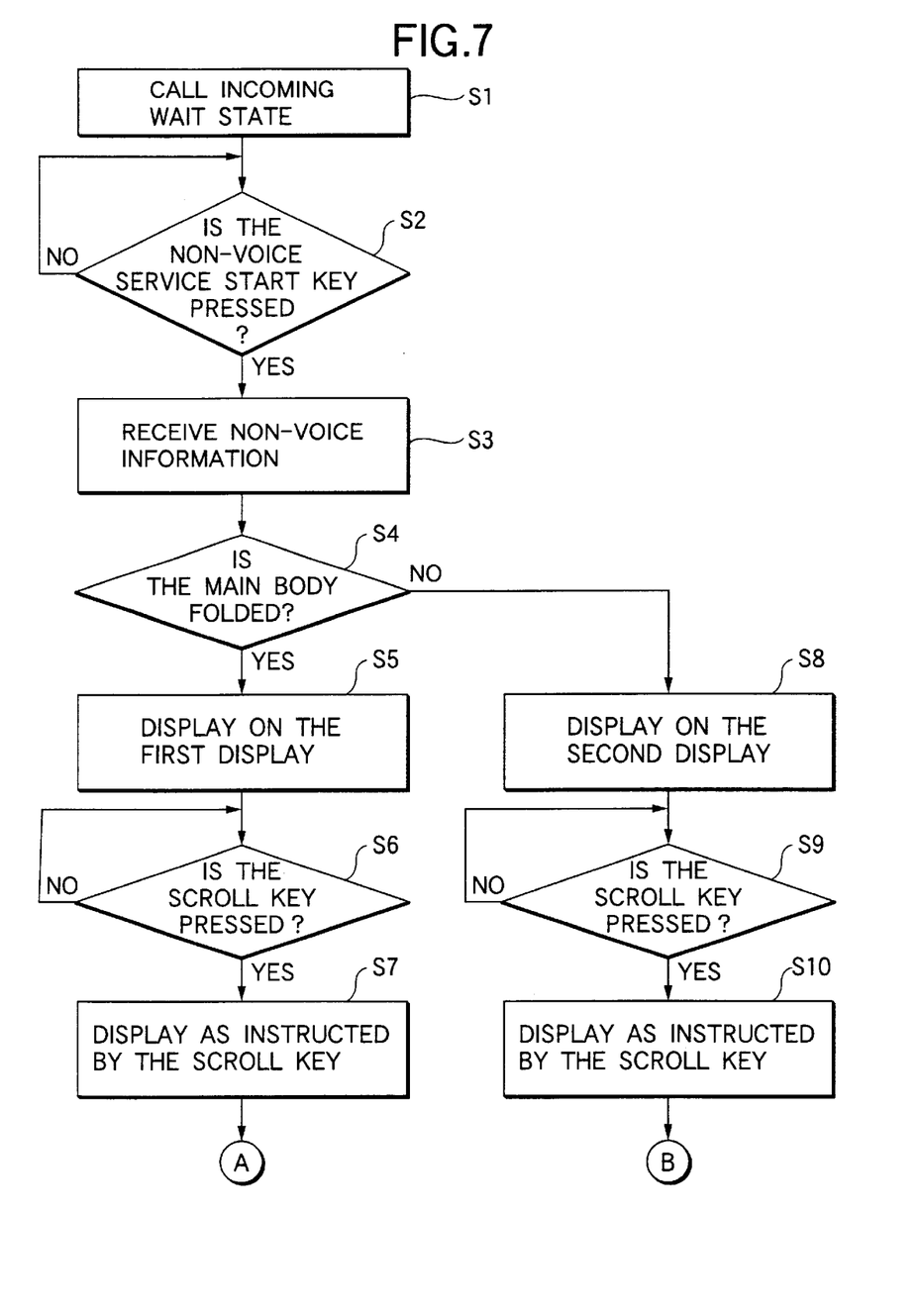
FIG. 7 is a flowchart showing which display is to be selected depending on the opening/closing state of the main body when non-voice radio communications service information is received in a procedure for displaying non-voice information according to the first embodiment of the invention.

FIG. 7 is a flowchart showing which display is to be selected depending on the opening/closing state of the main body when non-voice radio communications service information is received. With the folding portable telephone apparatus powered on and in the call incoming wait state (step 1), when the non-voice radio communications service start button 5 is pressed (step 2), the radio communication means 21 transmits signals requesting the non-voice radio communications service to the base station and receives non-voice information such as text and graphics from the base station (step 3). The controller 22 obtains opening/closing state detection information from the cover opening/closing state detector 27 to determine whether the main body is folded or not (step 4).

When the main body is folded, the controller 22 displays received non-voice information on the first display 4 (step 5). When a scroll button 6a/6b is pressed, display is scrolled (step 6). For a service such as the i mode, the selection/decision button 7 is used to select a menu and information is retrieved and displayed in a hierarchical fashion (step 7).

When the main body is unfolded, non-voice information is displayed on the second display (step 9). When a navigation key 11 (FIG. 2B) on the internal surface of the main unit is operated (step 9), display is scrolled and information is retrieved and displayed in a hierarchical fashion as required(step 10).

Thus, non-voice information is displayed on the first display 4 or second display 8 depending on the folding/unfolding state of the main body. The information displayed on the first display 4 on the external surface of the folded main body is the same as that displayed on the second display 8 on the internal surface of the unfolded main body.

Figure 8:
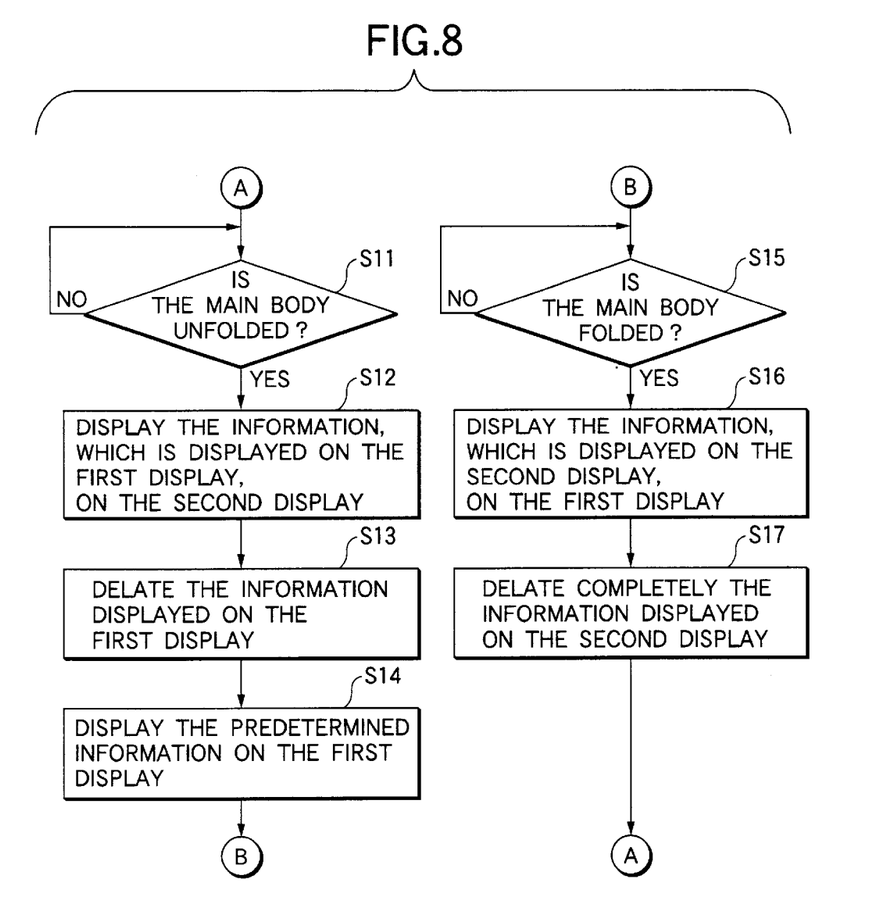
FIG. 8 is a flowchart showing which display is to be selected depending on the change in the opening/closing state of the main body while non-voice radio communications service information is being received in a procedure for displaying non-voice information according to the first embodiment of the invention.

FIG. 8 is a flowchart showing which display is to be selected depending on the change in the opening/closing state of the main body while non-voice radio communications service information is being received. AS shown in the flowchart of FIG. 8, when the main body is unfolded (step 11) while information is displayed on the first display 4 with the main body folded, information on the first display 4 is transferred to the second display 8 (step 12) and the information on the first display 4 is immediately deleted (step 13) and predetermined information is displayed (step 14). The predetermined information maybe graphics or text to represent "Call in progress. Sorry to disturb you." to people around the user, registered in advance and called up as required. Or, a liquid crystal backlight may blink slowly without displaying text or graphics in order to let people around the user know that a call is in progress.

When the main body is folded (step 15) while information is displayed on the second display 8 with the main body unfolded, information on the second display 8 is transferred to the first display 4 (step 16) and the information on the first display 4 is immediately deleted (step 17).

AS mentioned earlier, according to the invention, it is possible to see text and graphics information for the i mode and so on that could not be displayed on conventional folding portable telephone apparatus with the main body folded, easily by using a limited number of operation keys on the main body folded in compact size. It is also possible to scroll through the information and to retrieve the information in a hierarchical fashion. In other words, it is possible to provide new folding portable telephone apparatus that has eliminated the handling constraints of conventional folding portable telephone apparatus that the received non-voice information cannot be referenced or no operation is possible based on such information unless the main body is unfolded.

According to the invention, non-voice information is displayed on the display corresponding to the folding/ unfolding state of the main body. The information can be displayed on the display corresponding to a new folding/ unfolding state of the main body even when the folding/ unfolding state has changed with the information displayed on the proper display.

Figure 9A:
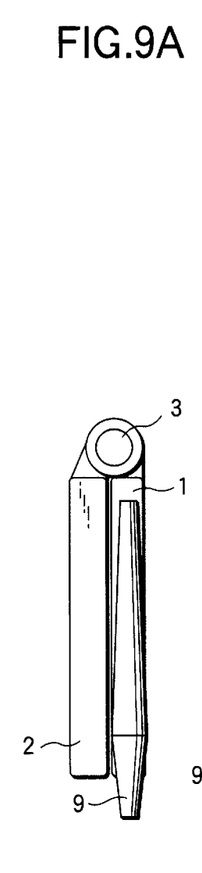
FIG. 9A is a side view of folding portable telephone apparatus according to the second embodiment of the invention with the main body folded.
Figure 9B:
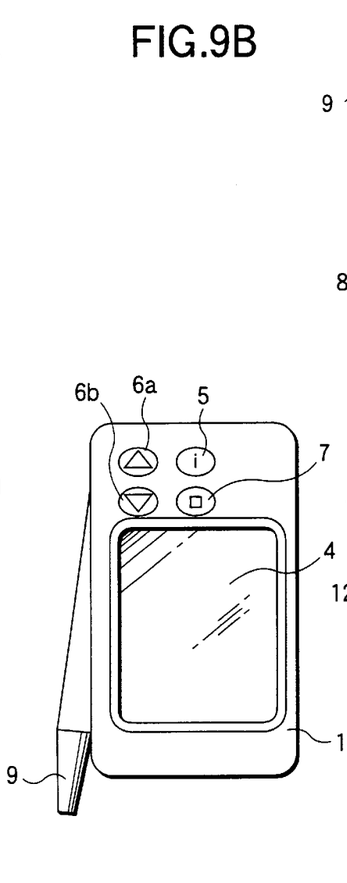
FIG. 9B is a front view of folding portable telephone apparatus according to the second embodiment of the invention with the main body folded.
Figure 9C:
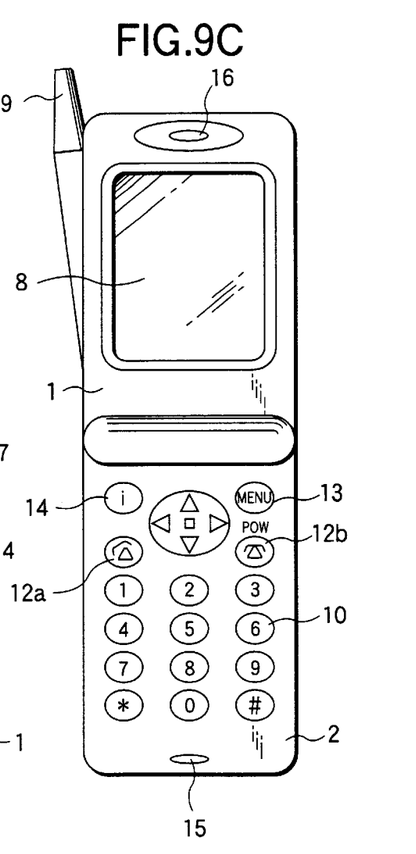
FIG. 9C is a front view of folding portable telephone apparatus according to the second embodiment of the invention with the main body unfolded.

FIG. 9 shows the second embodiment of the invention. The second embodiment differs from the first embodiment in that an antenna 9 is provided on the side of the first case body 1 equipped with the first display 4 and the second display 8. FIG. 9A is a side view of folding portable telephone apparatus according to the second embodiment of the invention with the main body folded. FIG. 9B is a front view of folding portable telephone apparatus according to the second embodiment of the invention with the main body folded. FIG. 9C is a front view of folding portable telephone apparatus according to the second embodiment of the invention with the main body unfolded. Same reference numerals are used for the same sections as in the first embodiment of the invention.

In the second embodiment of the invention in FIG. 9, an antenna 9 is provided retractably on the side of the first case body 1. This configuration has an advantage that a large-sized first display 4 can be employed although antenna retracting operability is almost the same as in a conventional example in FIG. 10.

Again, in the first embodiment of the invention, as shown in FIG. 5 where the main body is grasped, an antenna 9 is provided on the side of the second case body 2 equipped with neither the first display 4 nor the second display 8 and an antenna 9 is retractably provided slantwise from bottom to top on the side of the second case body 2. The antenna receiver as shown in FIG. 10 has been expelled from the external surface of the first main body so that large-sized display can be provided on the external surface of the first case body 1. Also, an antenna 9 is provided on the second main unit 2 held by the user in his/her palm so that the first case body 1 can be folded/unfolded irrespective of irrespective of the direction of the antenna 9 provided on the second case body 2 and whether the antenna 9 is stretched or housed.

It is possible to keep the main body low-profile without the antenna protruding in the direction of thickness of the main body and reducing the protrusion of an antenna receiver at the foot of the antenna to downsize the main body in the direction of width, thereby making the main body easier to grasp.

As mentioned earlier, the first aspect of the invention is a folding portable telephone apparatus having a folding main body, wherein the apparatus is equipped with first display for displaying received non-voice information on the external surface of the main body and second display on the internal surface of the main body. This configuration has an advantage that it is possible to automatically display information of the non-voice radio communications service such as "seven o'clock news" and "twelve o'clock news" on the first display on the external surface of the main body without specific operation, when the folding portable telephone apparatus has received text information such as news information automatically distributed at predetermined times.

The second aspect of the invention is a folding portable telephone apparatus having a folding main body, wherein the apparatus is equipped with at least operation means for starting or terminating non-voice radio communications and first display for displaying received non-voice information on the external surface of the main body and second display on the internal surface of the main body. This configuration has an advantage that the user can operate the operation means for starting non-voice radio communications with the folding portable telephone apparatus folded to request start of non-voice radio communications service and see the received non-voice information on the first display on the external surface of the main body.

The third aspect of the invention is a folding portable telephone apparatus according to the first or second aspect of the invention having at least a folding main body, first display for displaying received non-voice information on the external surface of the main body and second display on the internal surface of the main body, wherein the apparatus is adapted to display received non-voice information on the first display on the external surface of the main body while the main body is folded and to display received non-voice information on the second display on the internal surface of the main body while the main body is unfolded. This configuration has an advantage that the information can be displayed on the display corresponding to the folding/ unfolding state of the main body.

The fourth aspect of the invention is a folding portable telephone apparatus according to the first or second aspect of the invention having at least a folding main body, first display for displaying received non-voice information on the external surface of the main body and second display on the internal surface of the main body, wherein the apparatus is adapted to display received non-voice information on the first display on the external surface of the main body while the main body is folded and to display received non-voice information on the second display on the internal surface of the main body while the main body is unfolded, in order to switch to the display corresponding to a new folding/ unfolding state when the folding/unfolding state of the main body has changed with the information displayed on the proper display. This configuration has an advantage that the information can be displayed on the display corresponding to a new folding/unfolding state of the main body even when the folding/unfolding state has changed.

The fifth aspect of the invention is a folding portable telephone apparatus main body according to the fourth aspect of the invention having at least a folding main unit, first display for displaying received non-voice information on the external surface of the main body and second display on the internal surface of the main body, wherein the apparatus is adapted to switch from the first display to the second display on the internal surface of the main body when the main body has been unfolded while received information is displayed on the second display on the internal surface of the main body as well as to delete the information on the first display and to display predetermined information. This configuration has an advantage that it is possible to display predetermined information on the first display exposed when the main body has been unfolded.

The sixth aspect of the invention is a folding portable telephone apparatus according to the first or second aspect of the invention, wherein the apparatus is equipped with an antenna retractable slantwise on the side of the main body. This configuration has an advantage that it is possible to keep the main body low-profile without the antenna protruding in the direction of thickness of the main body and reducing the protrusion of an antenna receiver at the foot of the antenna to downsize the main body in the direction of width, thereby making the main body easier to grasp. Further advantage is that the antenna receiver has been expelled from the external surface of the main body so that large-sized display can be provided on the external surface of the main body.

The seventh aspect of the invention is a folding portable telephone apparatus according to the sixth aspect of the invention, wherein the apparatus is equipped with an antenna retractable slantwise on the side of the main body not provided with display. This configuration has an advantage that it is possible to fold/unfold the main body provided with display, irrespective of the direction of the antenna provided on the second main body not provided with display and whether the antenna is stretched or housed.

The eighth aspect of the invention is a folding portable telephone apparatus according to the first aspect of the invention, wherein the folding main body has a first case body and a second case body, and internal surfaces of the first case body and second case body face each other when the main body is folded, and wherein the first display is provided on the external surface of the first case body and the second display is provided on the internal surface of the first case body.

What is claimed is:

1. A folding portable telephone apparatus comprising:

a folding main unit comprising a first case body and a second case body;

a first display which displays received non-voice information and which is provided on an external surface of said first case body of said main unit; and a second display provided on an internal surface of said main unit;

wherein the received information is displayed on said first display if said main unit is folded, and received information is displayed on said second display if said main unit is unfolded, wherein when a folding/unfolding state of the main unit is changed, the received information is switched corresponding to the new folding/unfolding state in the main unit, wherein when the received information is switched from said first display to said second display, the received information displayed on said first display is deleted, and predetermined information is displayed on said first display while the received information is displayed on the second display.

2. A folding portable telephone apparatus according to claim 1, further comprising an antenna provided on the side surface of said main unit and retractable slantwise in the direction of width of the main unit.

3. A folding portable telephone apparatus according to claim 2, wherein said main unit has a first case body having said displays and second case body, wherein said antenna is provided on the side surface of the second case body.

4. A folding portable telephone apparatus according to claim 1, wherein internal surfaces of the first case body and second case body face each other when said main body is folded, wherein said second display is provided on the internal surface of the first case body.

5. A folding portable telephone apparatus according to claim 1, further comprising an operator for operating at least one of starting and terminating of non-voice radio communications.

* * * * *